US008659587B2

(12) United States Patent
Slack et al.

(10) Patent No.: US 8,659,587 B2
(45) Date of Patent: Feb. 25, 2014

(54) ELECTROWETTING SYSTEM

(75) Inventors: Anthony John Slack, Lorgues (FR); Roy Van Dijk, Eindhoven (NL); Henricus Petronella Maria Derckx, Weert (NL)

(73) Assignee: Liquavista, B.V., Eindhoven (NL)

( * ) Notice: Subject to any disclaimer, the term of this patent is extended or adjusted under 35 U.S.C. 154(b) by 34 days.

(21) Appl. No.: 13/017,680

(22) Filed: Jan. 31, 2011

(65) Prior Publication Data

US 2011/0187696 A1 Aug. 4, 2011

Related U.S. Application Data

(63) Continuation of application No. PCT/EP2009/059967, filed on Jul. 31, 2009.

(30) Foreign Application Priority Data

Aug. 1, 2008 (GB) .................... 0814079.0

(51) Int. Cl.
*G09G 5/00* (2006.01)
*G06F 3/038* (2013.01)

(52) U.S. Cl.
USPC ............................ 345/211; 345/107; 359/296

(58) Field of Classification Search
USPC ................... 345/211, 107, 204, 690; 359/296
See application file for complete search history.

(56) References Cited

U.S. PATENT DOCUMENTS

| 4,165,494 | A | 8/1979 | Becker |
| 5,552,802 | A | 9/1996 | Nonoshita et al. |
| 5,751,266 | A | 5/1998 | Crossland et al. |
| 6,504,524 | B1 | 1/2003 | Gates et al. |
| 6,873,378 | B2 | 3/2005 | Kai |
| 2002/0036636 | A1* | 3/2002 | Yanagi et al. ................. 345/211 |
| 2002/0105600 | A1 | 8/2002 | Shimoda et al. |
| 2002/0154080 | A1 | 10/2002 | Miyazaki |
| 2004/0252115 | A1* | 12/2004 | Boireau ........................ 345/211 |
| 2005/0001812 | A1 | 1/2005 | Amundson et al. |
| 2005/0024353 | A1 | 2/2005 | Amundson et al. |
| 2005/0057552 | A1 | 3/2005 | Foo et al. |
| 2005/0151709 | A1 | 7/2005 | Jacobson et al. |
| 2006/0044928 | A1 | 3/2006 | Chui et al. |
| 2006/0208968 | A1 | 9/2006 | Moon |
| 2006/0262083 | A1 | 11/2006 | Zhou et al. |
| 2006/0291125 | A1 | 12/2006 | Zhou et al. |

(Continued)

FOREIGN PATENT DOCUMENTS

| CN | 1339934 A | 3/2002 |
| JP | 9197368 A | 7/1997 |

(Continued)

*Primary Examiner* — Stephen Sherman
(74) *Attorney, Agent, or Firm* — BainwoodHuang

(57) ABSTRACT

An electrowetting system including a display device having a plurality of electrowetting elements, including a first electrowetting element and a second electrowetting element, each being configurable in a plurality of different display states; and a display controller for electrical addressing of the plurality of electrowetting elements in order to switch the plurality of electrowetting elements between different display states. The display controller is arranged to address the first electrowetting element twice subsequently, separated by a first addressing interval, and to address the second electrowetting element twice subsequently, separated by a second addressing interval, the second addressing interval being longer than the first addressing interval. The present invention further relates to a display controller, a driver stage and a method of controlling a display device.

28 Claims, 7 Drawing Sheets

(56) References Cited

U.S. PATENT DOCUMENTS

| | | |
|---|---|---|
| 2007/0063954 A1 | 3/2007 | Huang |
| 2007/0075941 A1* | 4/2007 | Zhou et al. ............... 345/84 |
| 2007/0159439 A1 | 7/2007 | Park |
| 2008/0129667 A1 | 6/2008 | Zehner et al. |
| 2008/0303780 A1* | 12/2008 | Sprague et al. ............. 345/107 |

FOREIGN PATENT DOCUMENTS

| | | |
|---|---|---|
| JP | P2003248468 A | 9/2003 |
| JP | P2005140958 A | 6/2005 |
| JP | 2007508576 A | 4/2007 |
| JP | 2007214659 A | 8/2007 |
| JP | P2007239463 A | 9/2007 |
| JP | 2009514006 A | 4/2009 |
| KR | 20030087498 A | 11/2003 |
| TW | I263966 B | 2/2000 |
| WO | 03/071346 | 8/2003 |
| WO | 2007/049196 | 3/2007 |
| WO | 2007057797 A1 | 5/2007 |
| WO | 2007/140202 A | 12/2007 |
| WO | 2008/059038 A | 5/2008 |
| WO | 2008/059039 | 5/2008 |
| WO | 2008/059040 | 5/2008 |
| WO | 2008/119774 | 9/2008 |

* cited by examiner

ELECTROWETTING SYSTEM

CROSS REFERENCE TO RELATED APPLICATIONS

This Patent Application is a Continuation of International Patent Application No. PCT/EP2009/059967 filed on Jul. 31, 2009, entitled, "ELECTROWETTING SYSTEM", which claims priority to GB0814079.0 filed Aug. 1, 2008, the contents and teachings of which are hereby incorporated by reference in their entirety.

FIELD OF THE INVENTION

The invention relates to an electrowetting system, particularly to addressing of electrowetting elements of a display device.

BACKGROUND OF THE INVENTION

Pixelated displays use image data to control the display state of each pixel. Before being sent to individual pixels, this data may be stored in a memory store of a slave display module after being sent from a master display controller. The memory store may be mounted on a substrate of the module along with the pixel matrix and associated circuitry.

To refresh the image displayed, it is common for the memory store to hold data indicative of the display state of each pixel. However, with the miniaturisation of pixel technology and the associated increase of the number of pixels in a display, the physical size of the memory store required increases accordingly. For example, for a video graphics display (VGA) of 480 rows and 640 columns of pixels, with a pixel refresh rate of 60 Hz, a 440 Mbits/s speed memory store is required. A memory store of this speed has a significant power consumption, which is problematic for mobile devices powered by batteries. Moreover, such a memory store is bulky and thus occupies a large area of the substrate. This is problematic since a substrate, for example of silicon, with the required area is expensive and would enlarge the size of the display.

The size of the memory store can be reduced by refreshing the pixel display states on a row by row basis, rather than frame by frame. Accordingly, the memory store can be linear, storing pixel data of one row of pixels at a time; see for example US patent publication no. 2007/0063954. A problem with this approach is that the data stored by the memory needs to be refreshed more often; for example, a memory store of 640 bits in length for the above-mentioned VGA display would need to be refreshed at a rate of 480×60 Hz. Such a refresh rate is very high and difficult to achieve. Further, a higher refresh rate involves greater power consumption, again causing problems for mobile applications. Moreover, a high amount of electromagnetic interference (EMI) is produced.

It is an object of the present invention to provide an improved display device.

SUMMARY OF THE INVENTION

According to the present invention, there is provided an electrowetting system including a display device having a plurality of electrowetting elements, including a first electrowetting element and a second electrowetting element, each being configurable in a plurality of different display states; and a display controller for electrical addressing of the plurality of electrowetting elements in order to switch the plurality of electrowetting elements between different display states, wherein the display controller is arranged to address the first electrowetting element twice subsequently, separated by a first addressing interval, and to address the second electrowetting element twice subsequently, separated by a second addressing interval, the second addressing interval being longer than the first addressing interval.

The invention provides selective addressing of electrowetting elements. Accordingly, one electrowetting element is re-addressed after a shorter interval than another. This means that only the elements, which may be display pixels, needing to be addressed are addressed to configure them in a desired display state. The phrase twice subsequently used herein in the context of element addressing means that an electrowetting element is addressed once at the start of an addressing interval, and once again at the end of the addressing interval. The two subsequent addressing actions are therefore separated by the addressing interval. Addressing an electrowetting element in the context of the present invention includes an act of refreshing a display state of an electrowetting element, resetting a display state of an electrowetting element, or changing a display state of an electrowetting element.

Selective pixel addressing has significant advantages. Since less data needs to be sent to the display, a memory store for controlling addressing of pixels does not need to store pixel data for an entire image frame; only data relating to selected pixels for updating or refreshing needs to be stored, significantly reducing the memory size required. Further, the power consumption of the display device is significantly reduced, because significantly less information needs to be provided to update the display, compared with addressing each pixel per frame, i.e. data does not need to be sent to those elements not needing to be addressed. Also, when the information in the display state is static or is updated infrequently, the addressing rate of the display can be significantly reduced, for instance due to the fact that less information needs to be provided and that electronics may be switched off for a longer period of time at the periods where no addressing of the display occurs. Indeed, power consumption is reduced even further because no data has to be supplied to those pixels that do not change their display state, unless they are approaching the expiry of their second addressing interval. Furthermore, the data clock rate can be significantly lower, leading to a reduction of power consumption in for instance the display controller. Yet further, by addressing fewer pixels per frame, electromagnetic interference from the display is reduced and electromagnetic compatibility (EMC) is improved.

Another benefit that arises when the display can be addressed per pixel rather than addressing all lines during each frame is that information content can be strongly limited, leading to a strong compression of data and a much reduced data rate related to the data clock rate required for the exchange of information. This is especially beneficial for mobile devices with a low bandwidth for data receipt.

An electrowetting display has video capability. Typical applications of an electrowetting display include watches and mobile phones, but can also include video displays for viewing movies, all having a low power consumption. This is surprising; a high rate of display content change means a high switching rate, power consumption being related to switching rate. However, usually, most of the image content does not change from "frame" to "frame" in a video, and therefore the present invention utilises this insight to reduce the power dissipation of the display while simultaneously providing the capability of a fast switching rate of image content in the display.

It is noted that U.S. Pat. No. 5,751,266 describes selective pixel addressing of bi-stable liquid crystal (LC) cells, and U.S. Pat. No. 6,504,524 describes selective addressing of groups of bi-stable electrophoretic pixels. The pixels disclosed in these prior art documents are different from electrowetting elements, which are quasi-stable as explained below, since the display state of an electrowetting element of the invention must be refreshed after a certain holding interval, unlike a bi-stable cell. Whilst U.S. Pat. No. 6,504,524 refers to bimetastable pixels which eventually require "blanking", the term bi-stable used therein means that a pixel maintains its optical state sufficiently long for the desired application, when an addressing voltage is removed from the pixel. This differs from the electrowetting elements of the invention which require a voltage to be applied during certain display states, and are quasi-stable. Moreover, selective pixel addressing of such electrophoretic pixels produces poor quality images, due to cross-talk between adjacent pixels, since it is necessary to apply high voltage pulses to reset a pixel display state. Further, electrophoretic or LC pixels cannot be updated quickly enough to display video. In the system of U.S. Pat. No. 6,504,524, the display state does not change, or changes very slowly, when an applied voltage is removed, which makes it unsuitable for video display. Also, LC displays require an inversion scheme, unlike electrowetting displays; hence selective pixel addressing on an electrowetting display is simpler to implement.

It should be noted that International application WO 2007/049196 discloses the use of an electrowetting element in an active matrix display device. However, no mention is made of selective pixel addressing.

Selectively addressing electrowetting elements of a display is surprisingly advantageous, due to their quasi-stability; one would expect to refresh each element after the same interval to avoid deterioration of the image, rather than addressing different pixels after different intervals. The insight of the invention lies in the fact that an electrowetting element has a longer holding time of a display state compared with a known non-bi-stable pixel. Indeed, even longer holding states can be obtained using a storage capacitor. US publication no. 2005/0057552 describes selective pixel addressing of liquid crystal cells; some pixels are refreshed at a frame rate of 60 Hz whilst others are refreshed at a frame rate of 15 Hz. These pixels are limited to a minimum frame rate of 15 Hz, a lower frame rate than 15 Hz is not disclosed; indeed, a frame rate of lower than 15 Hz, combined with the inversion addressing that is required for an LCD is disadvantageous, since a viewer may perceive flicker of the image, as explained further below. The quasi-stability of the electrowetting elements of the present invention allows a lower refresh rate to be used, which reduces image flicker and allows pixel display states to be held for a longer time without refreshing.

A LC element shows a degradation of performance due to permanent charge build-up in the element during the application of an electric field. Charge build-up will result in reduced image quality due to image retention and/or grey scale shifts. The degradation can be reduced by alternating the voltage applied on the LC element between +V and −V in a regular cycle. When reducing the cycle frequency below 15 Hz, charge build-up will occur. This charge build-up offsets the applied voltages, which results in different optical images during the negative and the positive part of the cycle. Hence, refresh rates lower than 15 Hz will cause a clearly visible flicker, as the human eye is most sensitive to intensity variations at frequencies around 5 to 15 Hz. These phenomena limit the frame rate of LC displays to 15 Hz or higher. When the LC element is used together with a switch, the holding time must be less than 67 ms to avoid degradation of the performance of the element.

The invention is based on the insight that an electrowetting element shows behaviour different from a liquid crystal (LC) element. An electrowetting element does not show charge build-up during the application of a voltage. Hence, no alternating voltage is required to maintain a display state without degradation. The possibility to use a dc-voltage to control the electrowetting element during the entire time a certain display state must be maintained allows the application of a holding state during a period longer than 70 ms. The capacitance of the electrowetting element and the leakage current have a magnitude to maintain substantially the required voltage over the element during a holding state of longer than 70 ms. 'Substantially maintained' means that the change in the voltage changes does not cause a visible change in the display state of the element; this can be a change of less than 10%. Since the display state of the element is determined by the position of the fluids and the position of the fluids in the element is determined by the voltage, the position is maintained during the holding state. Such a state of the element is therefore called a quasi-stable state.

In an LC element leakage current through the LC material affects the performance of the element. The leakage causes charges to reposition within the element when a voltage is applied across the cell-gap. The main voltage drop occurs now across the dielectric layers between the electrodes and the LC material, and as a result, the voltage drop across the LC material is reduced. This alters the optical state and therefore limits the holding time, as the holding time of the liquid crystal element is to a large extent determined by the relaxation of the liquid crystal molecules to their zero-voltage state.

Leakage current causes charging and breakdown of the LC material, which further affects performance of the LC elements. Also, in LCDs, the pixel capacitance is lower and also the change in capacitance is smaller; this makes LCDs more sensitive to changes in pixel voltage due to leakage currents, in comparison with electrowetting displays.

The duration of the holding state of an LC element is also limited by the combination of the magnitude of the capacitance of the element and the leakage current. The holding time may be increased by increasing the capacitance. This capacitance includes the capacitance between the electrodes of the element and the storage capacitor which is integrated on a support plate of the display device. The capacitance may be increased for instance by increasing the area of the storage capacitor, by decreasing the thickness of the dielectric in the storage capacitor or by increasing the dielectric constant of the dielectric used in the storage capacitor. However, an increase in area of the storage capacitor reduces the optical transmission of a pixel by occupying more of a pixel aperture area and also the area available for the other components of the system, such as the transistor and the wiring for the rows and columns and may increase the leakage current. Changing either the thickness or the dielectric constant of the dielectric is another possibility to increase the capacitance. This, however, has a negative impact on the manufacturing yield as it has a significant effect on the performance of the thin-film transistor (TFT) in the same element, because the same dielectric is normally used for the TFT and the storage capacitor. Changing the thickness or dielectric constant of the dielectric to increase the capacitance is therefore not preferred. The holding state of the LC element to maintain the desired display state must therefore be shorter than 220 ms. It should be noted that the LC element can only maintain its display state during so long a period if the above-mentioned charge build up in the element has been reduced to such an extent that the AC voltage can be applied to the element at a frequency down to 4.5 Hz without resulting in flicker.

The electrowetting element has few problems caused by leakage. Since leakage of current through the first fluid does not play a role, there is no repositioning of charge in the element. The element has a relatively large capacitance and a very low leakage current. Hence, it has a long holding time. The position of the fluids is determined by the applied voltage and hence the applied electric field. The position of the fluids in the electrowetting element is maintained for a long period of time when the switch is open. As a result the element when used in a display device will maintain its display state, which is determined by the position of the fluids, for this longer period of time as well.

Preferably, at the end of the second addressing interval, the display controller is arranged to refresh the display state of the second electrowetting element. The term refresh is used herein in the context of addressing an element to refresh its display state so as to maintain the same display state after the addressing action as at the start of the second interval. The second addressing interval in this embodiment corresponds with the holding time of the element after which the display state deteriorates to an unacceptable display state for displaying the pixel image. This deterioration occurs due to resistive losses, i.e. current leakage in the element. A refresh involves setting the voltage applied across the element back to the intended applied voltage value for the display state required. Therefore, by addressing the second element at the end of the second addressing interval, the display state of the quasi-stable element is refreshed to the same state before it deteriorates, thus maintaining a high quality image. Such refreshing may therefore involve a display state change, by restoring the display state from a display state which has begun to deteriorate by the end of the second interval. It is noted that the blanking signal described in U.S. Pat. No. 6,504,524 relates to a process of configuring all pixels in the same display state. This differs from the refresh described herein for the present invention, which is used to prevent image deterioration when a voltage is applied.

Preferably, at the end of the second addressing interval, the display controller is arranged to reset the display state of the second electrowetting element. The meaning of the term reset used herein is similar to that of the term refresh used herein, so far as it is used in the context of addressing an element to maintain the same display state after the reset action as at the beginning of the second addressing interval. A reset is applied to restore the intended display state after deterioration of the display state due to backflow, preferably before a viewer perceives the deterioration. Backflow is the phenomenon that, in spite of the fact that a constant non-zero voltage is maintained on the electrowetting element in the absence of a leakage current, the position of at least one of the fluids tends to recede to the position of the fluid when a zero voltage is applied to the element. Consequently, a non-zero voltage display state of the electrowetting element may tend to return to a zero voltage display state despite application of a non-zero voltage. Backflow does not occur for LC displays, and therefore LC displays do not require a reset as described herein.

A reset involves setting the voltage applied across the element momentarily, for example for approximately 1 ms, to 0V, or near to 0V, and then restoring the applied voltage to the value required to obtain the intended display state. In this way, any display deterioration due to backflow is cleared. The duration of the reset is short enough not to affect the fluid configuration substantially, i.e. preferably so that a viewer of the element does not perceive a change of display state, and therefore does not degrade the display state further.

The reset of an element may be performed at a different time from a refresh of that element. Alternatively, the refresh and the reset of an element may be performed together, preferably simultaneously. Advantageously, the reset may be arranged to coincide with the refresh, at the end of the second addressing interval. Resets may be performed less frequently than refreshes. Therefore, in embodiments where the display is arranged to perform the refresh and reset together, this may include resetting the element, when required, at the end of an addressing interval equal in duration to a plurality of the second addressing intervals. Alternatively, refreshes may be performed less frequently than resets. In this way, selective pixel addressing of electrowetting elements is realised in a simple and efficient manner, overcoming any backflow and current leakage problems, and avoiding separate reset and refresh actions which would complicate selective pixel addressing and increase the power consumption.

It is to be understood that, when the term refresh is used herein, including for the embodiments described below, in the context of refreshing a display state of an electrowetting element at the end of the second addressing interval, further embodiments are envisaged in which a reset may be applied as an alternative to a refresh; or a reset may be applied in combination, for example simultaneously, with a refresh at the end of the second addressing interval.

Further preferably, the second addressing interval is longer than an addressing interval which a human eye is most sensitive to. The human eye is most sensitive to luminance changes of a pixel display state caused by addressing at frequencies of approximately 5 to 15 Hz. At these frequencies small changes in a luminance level (or reflectivity level) of a pixel display state, for example between 5% and 10%, might already be seen by the human eye as flicker. The human eye is less sensitive to luminance changes caused by addressing frequencies outside of the range of approximately 5 to 15 Hz, and therefore allows a larger change in pixel luminance level (or reflectivity) before perceiving such changes as flicker. Luminance changes caused by addressing at frequencies lower than approximately 5 Hz are perceived mainly as changes in image brightness. The reduced sensitivity of the eye at frequencies higher than approximately 15 Hz is caused by the integrating effect of the eye; luminance changes at these frequencies are at least partly perceived as changes in average image brightness. Frequencies of 5, 10 and 15 Hz correspond with, respectively, addressing intervals of 200, 100 and 66.67 ms. Addressing, for example refreshing, of the second electrowetting element at a slower rate than approximately 5 to 15 Hz for example, with the element remaining in the same display state, is hardly perceptible, if not imperceptible, to a human eye; this means that any alteration of display state associated with addressing the element at these low frequencies is not detected as flicker.

A change in display state luminance of the electrowetting element may be small; smaller than 10%, or 5%, of the overall display state for example; this is not noticeable by the human eye. A storage capacitor connected in parallel with the element may be used to reduce the luminance change. The electrowetting element may therefore be addressed at intervals corresponding to any addressing frequency, including the range of approximately 5 to 15 Hz. Since the perception of flicker depends on the luminance of the pixel, the level may need to be selected so it is sufficiently low that the human eye does not perceive any luminance changes caused by addressing at this frequency as flicker. Accordingly, an electrowetting display device can be provided with a high quality image, free of flicker.

In further embodiments of the invention, the display controller is arranged to change the display state of the first electrowetting element at the end of the first addressing interval. The term change is used herein in the context of addressing an element to update its display state to provide a different display state after the addressing action than at the start of the first interval. With the first interval being shorter than the second interval, the first electrowetting element may therefore have its display state updated to a different display state, without changing the display state of the second electrowetting element too, which remains in its present display state. Accordingly, the display has a reduced power consumption and requires a lower bandwidth for receiving image data. Additional electrowetting elements of the display may also have their display state changed at the first addressing interval. In some embodiments of the invention, the pixel addressing mechanism may address other electrowetting elements, different from those having their display state changed, without changing their display state; for example, all electrowetting elements of a row of elements may be addressed, but only a selection of those elements will have their display state changed.

In preferred embodiments, the first addressing interval is shorter than an addressing interval which a human eye is most sensitive to, and may for example be 10 or 20 ms. The sensitivity of the human eye to certain addressing frequencies is explained above. Pixels of prior art bi-stable displays may be updated at a minimum interval which is significantly longer than that possible for electrowetting elements. Accordingly, unlike bistable displays, the electrowetting elements of the invention are suitable for providing video with a higher pixel change rate, where the first interval may be approximately 5 ms or shorter (i.e. an update rate of approximately 200 Hz or higher). Since the first addressing interval may be shorter than addressing intervals most sensitive to the human eye, high quality video without perceptible flicker may be provided. A first interval of longer than approximately 5 ms would also allow video images to be displayed, for example using analog grey scale displays.

According to further embodiments of the invention, the plurality of electrowetting elements is arranged for passive matrix, active matrix or direct drive operation. The present invention may therefore be applied to a variety of display constructions, providing a high level of design freedom.

Preferably, the electrowetting system of the invention includes at least one driver stage electrically connected to at least one of the plurality of electrowetting elements, wherein the display controller is arranged to control the at least one driver stage to determine the display state of at least one of the plurality of electrowetting elements and the driver stage has a high impedance state. Using a so called tri-state driver stage with a high impedance state as well as an on state and an off state allows the advantages of the invention to be provided in an electrowetting display simply and efficiently. In a direct drive display, one driver stage can be connected to one electrowetting element. The high impedance driver stage can also be used in an active matrix display; then, data is sampled on the transistor in an active matrix display which has a high impedance. In further embodiments at least one driver stage may be electrically connected to a plurality of electrowetting elements.

In embodiments of the invention, the display controller is arranged to refresh the display state of each of the plurality of electrowetting elements substantially simultaneously. Accordingly, the display state of each pixel may be refreshed, providing a global display refresh. Such a refresh may be for example performed to update each pixel, ensuring an up to date image is displayed. This refreshing may be in accordance with an image data format such as Moving Picture Experts Group (MPEG) data, as explained later.

In other embodiments of the invention, the display controller is arranged to refresh the display state of a first group of the plurality of electrowetting elements at a predetermined point in time and to refresh the display state of a second, different, group of the plurality of electrowetting elements at a different predetermined point in time. Some pixels may be refreshed at different intervals than other pixels, thus providing a selective refresh of the display. For example, different rows of pixels may be refreshed at different moments than other rows of pixels, to provide a global display refresh without all the pixels being refreshed at once, which avoids a viewer perceiving the refresh of all pixels. Further, a display may have different parts having different addressing rates, so that a first part may display rapidly changing images, such as video, whereas a second part may display a still, or slowly changing image. LC displays cannot be arranged to have different areas with different refresh rates, due to the need to be addressed using AC voltage. This is caused by the need to address several rows/columns to obtain a suitable inversion scheme for correct operation of LC displays. In contrast, electrowetting elements can be switched using DC voltage, since no inversion scheme is required.

Preferably, the electrowetting system comprises a memory store arranged to store data indicative of the time elapsed since last addressing each of the plurality of electrowetting elements. In this way, passing of the second addressing interval can be monitored so as to refresh the display state of each pixel before deterioration of the display state occurs due to limited quasi-stability.

In preferred embodiments, the electrowetting system includes an image data processor arranged to compare input image data representative of a first image with input image data representative of a consecutive second image to generate output image data identifying which of the plurality of electrowetting elements require a display state change. Using this comparison, only selected pixels are identified for a display state change, which minimises power consumption and required bandwidth of display drivers.

In further preferred embodiments, the electrowetting system includes an image data processor arranged to process input image data indicative of image differences between a first image and a consecutive second image to identify which of the plurality of electrowetting elements require a display state change. Input image data, for example MPEG data, or similar image compression technologies, may identify differences between the first and second images, otherwise referred to as delta data, rather than providing details of the display state of each pixel of the second image. Use of such a data format allows selective pixel addressing to be implemented simply, and allows efficient data transfer. Moreover, using MPEG decoding with the selective pixel addressing of electrowetting elements of the present invention is envisaged to provide high quality video images without the motion or block artefacts experienced in LCD technology.

Further preferably, periodically, the input image data is indicative of a display state of each of the plurality of electrowetting elements. MPEG data for example, as explained above, indicates differences between subsequent images. However, minor changes in the display state of a pixel between consecutive frames may not be significant enough to be included in the data for a new image. Therefore, periodically, the input data denotes the current display state for every pixel, and the pixels are updated accordingly, ensuring the display state of each pixel is correct for the present image.

In preferred embodiments, the plurality of electrowetting elements has a first group of electrowetting elements including the first electrowetting element, and a second group of electrowetting elements including the second electrowetting element, and the display controller is arranged to address the first group twice subsequently, separated by a first addressing interval, and to address the second group twice subsequently, separated by a second addressing interval. In this way, a set of pixels, for example a block or a row of pixels, may be selectively addressed rather than individual pixels. In other words, more than one element may be addressed at the first addressing interval, and more than one element may be addressed at the second addressing interval. This may provide a more efficient scheme of updating or refreshing pixels of larger displays. Further, a memory store need only store data relating to those rows requiring addressing, meaning a smaller memory store may be used. Moreover, displays may be constructed having a faster pixel change area, and a slower pixel change/refresh area.

According to a further aspect of the invention, there is provided a display controller for electrical addressing of a plurality of electrowetting elements in order to switch the plurality of electrowetting elements between different display states, wherein the plurality of electrowetting elements includes a first electrowetting element and a second electrowetting element, and the display controller is arranged to address the first electrowetting element twice subsequently, separated by a first addressing interval, and to address the second electrowetting element twice subsequently, separated by a second addressing interval, the second addressing interval being longer than the first addressing interval.

According to another aspect of the invention, there is provided a driver stage for electrical connection to at least one of a plurality of electrowetting elements, wherein the driver stage is arranged to address electrically, under control of a display controller, at least one of the plurality of electrowetting elements in order to switch the plurality of electrowetting elements between different display states, wherein the plurality of electrowetting elements includes a first electrowetting element and a second electrowetting element and the driver stage is suitable for addressing the first electrowetting element at the end of a first addressing interval, and for addressing the second electrowetting element at the end of a second addressing interval, the second addressing interval being longer than the first addressing interval. The driver stage may preferably have a high impedance state, thus providing tri-state switching of the display as described in further detail below.

A further aspect of the invention relates to a method of controlling a display device having a plurality of electrowetting elements, including a first electrowetting element and a second electrowetting element, each being configurable in a plurality of different display states by electrical addressing of the electrowetting element, the method including:

a) addressing the first electrowetting element twice subsequently, separated by a first addressing interval; and b) addressing the second electrowetting element twice subsequently, separated by a second addressing interval, the second addressing interval being longer than the first addressing interval.

Further features and advantages of the invention will become apparent from the following description of preferred embodiments of the invention, given by way of example only, which is made with reference to the accompanying drawings.

BRIEF DESCRIPTION OF THE DRAWINGS

FIG. 2($b$) shows part of an electrowetting system including a storage capacitor, according to a further embodiment;

FIG. 3($b$) shows a timing diagram of the embodiment of FIG. 3($a$);

FIG. 4($b$) shows a timing diagram of the embodiment of FIG. 4($a$);

FIG. 5($b$) shows a timing diagram of the embodiment of FIG. 5($a$);

DETAILED DESCRIPTION OF THE INVENTION

Figure 1:
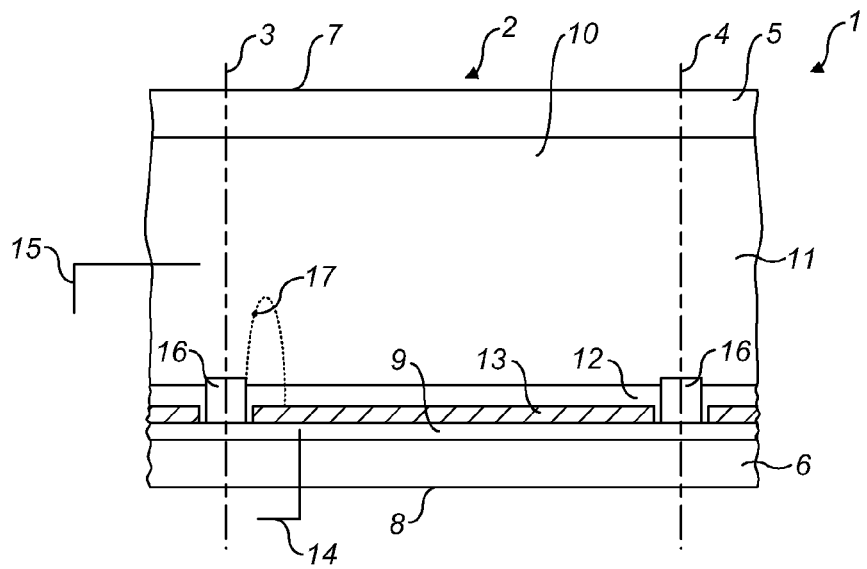
FIG. 1 shows a diagrammatic cross-section of a part of electrowetting system according to the invention.

FIG. 1 shows a diagrammatic cross-section of an embodiment of an electrowetting display device 1. The display device includes a plurality of electrowetting elements 2, one of which is shown in the Figure. The lateral extent of the element is indicated in the Figure by the two dashed lines 3, 4. The electrowetting elements comprise a first support plate 5 and a second support plate 6. The support plates may be separate parts of each electrowetting element, but the support plates are preferably shared in common by the plurality of electrowetting elements. The support plates may be made for instance of glass or polymer and may be rigid or flexible.

The display device has a viewing side 7 on which an image or display formed by the display device can be viewed and a rear side 8. The first support plate 5 faces the viewing side; the second support plate 6 faces the rear side 8. In an alternative embodiment the display may be viewed from the rear side 8. The display device may be of the reflective, transmissive or transflective type. The display may be a segmented display type in which the image is built up of segments. The segments can be switched simultaneously or separately. Each segment includes one electrowetting element 2 or a number of electrowetting elements 2 that may be neighbouring or distant. The electrowetting elements included in one segment are switched simultaneously. The display device may also be an active matrix driven display type or a passive matrix driven display.

A space 10 between the support plates is filled with two fluids: a first fluid 12 and a second fluid 11. The second fluid is immiscible with the first fluid. The second fluid is electrically conductive or polar, and may be water or a salt solution such as a solution of potassium chloride in a mixture of water and ethyl alcohol. The second fluid is preferably transparent, but may be coloured, white, absorbing or reflecting. The first fluid is electrically non-conductive and may for instance be an alkane like hexadecane or (silicone) oil. A hydrophobic layer 13 is arranged on the support plate 6, creating an electrowetting surface area facing the space 10. The layer may be an uninterrupted layer extending over a plurality of electrowetting elements 2 or it may be an interrupted layer, each part extending only over one electrowetting element 2, as shown in the Figure. The layer may be for instance an amorphous fluoropolymer layer such as AF1600 or another low surface energy polymer. Alternatively the electrowetting element may be constructed with the first liquid 12, the electrode 14, the hydrophobic layer 13 and the walls 16 adjacent the first support plate 5. In this configuration the first liquid is arranged at the viewing side 7 of the space 10 instead of at the rear side 8. Also, in an alternative configuration the electrowetting elements can be positioned on top of each other to include more than one switchable electrowetting elements in series in the optical path. Further integration of the switchable elements can be achieved by including one or more further first fluids in each of the electrowetting element. The hydrophobic character of the layer 13 causes the first fluid to adhere preferentially to the support plate 6 since the first fluid has a higher wettability with respect to the surface of the hydrophobic layer 13 than the second fluid. Wettability relates to the relative affinity of a fluid for the surface of a solid. Wettability increases with increasing affinity, and it can be measured by the contact angle formed between the fluid and the solid and measured internal to the fluid of interest. This increases from relative non-wettability at an angle of more than 90° to complete wettability when the contact angle is 0°, in which case the fluid tends to form a film on the surface of the solid.

Each element 2 includes an electrode 9 arranged on the second support plate 6. The electrode 9 is separated from the fluids by an insulator, which may be the hydrophobic layer 13. In general, the electrode 9 can be of any desired shape or form. The electrode 9 is supplied with voltage signals by a signal line 14. A second signal line 15 is connected to an electrode which is in contact with the conductive second fluid 11. This electrode may be common to all elements, when they are fluidically interconnected by and share the second fluid, uninterrupted by walls. The electrowetting elements 2 are controlled by a voltage $V_e$ applied between the signal lines 14 and 15. The electrodes 9 on the support plate 6 each are connected to a display driving system by a matrix of printed wiring on the support plate. This wiring can be applied by various methods, such as sputtering and structuring or printing techniques.

In a display of the segment type, the electrode 9 may extend over several elements and define an image region of a plurality of electrowetting elements, which will all be switched simultaneously. When a segment covers several electrowetting elements, the signal line 14 is a common signal line for these electrowetting elements.

The lateral extent of the first fluid 12 is constrained to one electrowetting element by walls 16 that follow the cross-section of the electrowetting element. In the embodiment shown in FIG. 1 the walls define the extent of the hydrophobic layer 13. When the hydrophobic layer extends over a plurality of elements, the walls are preferably arranged on top of the layer. Alternatively, or additionally, the walls may comprise hydrophilic areas for constraining the first fluid. Further details of the electrowetting elements of the display are disclosed amongst others in international patent application WO 03071346.

The first fluid absorbs at least a part of the optical spectrum. The fluid may be transmissive for a part of the optical spectrum, forming a colour filter. For this purpose the fluid may be coloured by addition of pigment particles or dye. Alternatively, the first fluid may be black, i.e. absorb substantially all parts of the optical spectrum, or reflecting. The hydrophobic layer may be transparent or reflective. A reflective layer may reflect the entire visible spectrum, making the layer appear white, or part of it, making it have a colour.

When the voltage $V_e$ applied between the signal lines 14 and 15 is set at a non-zero active signal level $V_a$, the element will enter into an active state. Electrostatic forces will move the second fluid 11 towards the segment electrode 9, thereby pushing away and displacing the first fluid 12 from at least part of the area of the hydrophobic layer 13 towards the walls 16 surrounding the area of the hydrophobic layer. When fully repelled the first fluid is in a drop-like form as schematically indicated by a dashed line 17. This action uncovers the first fluid from the surface of the hydrophobic layer 13 of the electrowetting element. When the voltage across the element is returned to an in-active signal level of zero or a value near to zero, the element will return to an inactive state, where the first fluid flows back to cover the hydrophobic layer 13. In this way the first fluid forms an electrically controllable optical switch in each electrowetting element.

The electrowetting element forms a capacitor. The second fluid 11 and the electrode 9 form the plates and the first fluid 12 and the hydrophobic layer 13 the dielectric layer. When the first fluid is in the active state, i.e. having the form 17, the capacitance of the element is higher than when the first fluid is in the in-active state, i.e. having the form 12.

Figure 2A:
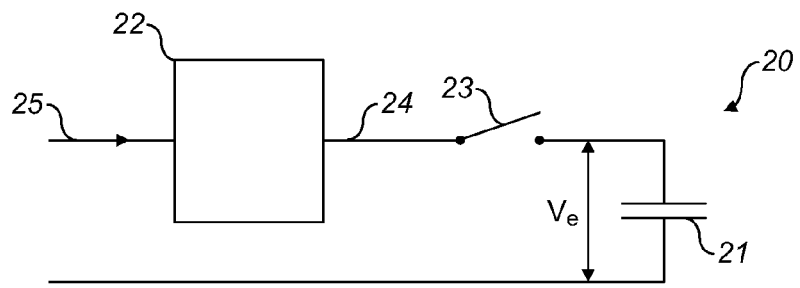
FIG. 2($a$) shows part of an electrowetting system according to the invention.

FIG. 2(a) shows an electrowetting system 20 comprising an electrowetting element, shown as a capacitor 21, a driver stage 22 for applying a voltage $V_e$ to the element and a switch 23 connecting the electrowetting element 21 to an output 24 of the driver stage. The driver stage 22 receives a signal from the display controller at its input 25 for setting the voltage $V_e$ over the electrowetting element. When the switch 23 is closed, the capacitor 21 is charged to the voltage $V_e$. After opening the switch 23, the voltage level is maintained during a holding state. The duration of this state depends on the capacitance of the capacitor 21 and the leakage current of the electrowetting element and of the switch. When the switch is integrated in the driver stage, the leakage current is that of the driver stage in its high-impedance state. A typical electrowetting element having a cross-section of 150 µm by 150 µm has a capacitance of 0.1 pF when in the in-active state and 0.5 pF when in the active state and a leakage current of less than 0.2 pA. A typical electronic switch, such as a thin-film transistor (TFT), has an open resistance of approximately $10^{12}$-$10^{13}\Omega$ or higher.

These values allow a duration of the holding state of more than 70 ms. For static applications, such as watch displays, electronic books, electronic dictionaries, GPS devices, a typical duration is 100 ms to 1 s, that will result in a significant reduction of power consumption. The relatively long holding state for the electrowetting element is not due to a slow response of the first fluid to return to the in-active state, but due to the fact that the voltage is maintained over the element. Since the usual electrowetting element is not bi-stable but quasi-stable, the voltage over the element must be maintained to maintain the display state, in contrast with bi-stable elements such as an electrophoretic element, where in either of the two states no voltage is required to maintain the state. The holding time is defined as the time from the opening of the switch till the moment the voltage over the element has dropped such that the display state has reduced to 90% of the display state on opening the switch. The duration of the holding state is preferably sufficiently short not to cause a visible change in the optical state of the element. Demanding applications may require that the duration of the holding state is shorter than the holding time. Less demanding applications may require that the duration of the holding state is shorter than two or three times the holding time. At the end of the holding state the element is refreshed by bringing the voltage up to the required level again.

Since an electrowetting element is not bi-stable, such as an electrophoretic element, but quasi-stable, it is easier for an electrowetting element to attain positions of the first and second fluid in between the active and in-active state. In such a state the element has a so-called grey-value display state, which can also be maintained when the switch is open. Many different grey scale states are obtainable by changing the fluid positions accordingly. Furthermore, an electrowetting element having a long duration holding state can switch sufficiently fast between the display states for showing video images having a refresh rate of e.g. 10 or 20 ms.

Figure 2B:
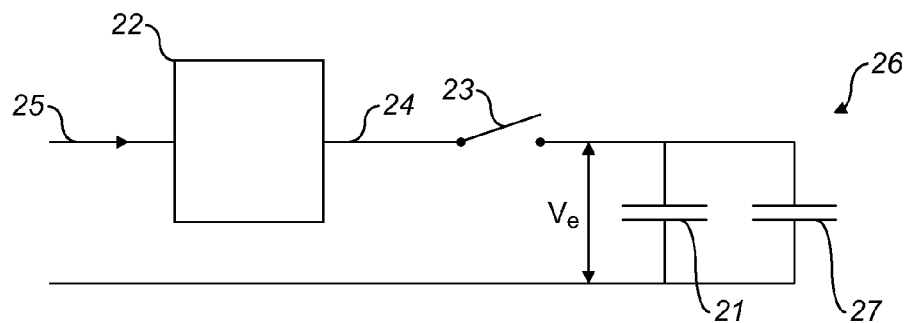

FIG. 2(b) shows an electrowetting system 26 similar to that of FIG. 2(a). A storage capacitor 27 is connected parallel to the element 21. The capacitance determining the duration of the holding state is the capacitance of capacitors 21 and 27. The storage capacitor may be connected to any fixed voltage line. The duration of the holding state can be increased by adding a capacitor connected parallel to the element. Whereas, a LC display has a small capacitance and also a small change in capacitance as a function of the white (i.e. open) display state, meaning it is therefore more sensitive to leakage currents. An LC display element therefore requires a storage capacitor parallel to the element to reduce the effect of leakage in the element. An electrowetting element may use a capacitor to reduce the effect of variation in capacitance of the element due to the variation in position of the fluids in the element.

In FIGS. 2(a) and (b) the switch 23 is shown as a separate element between the output 24 of the driver stage 22 and the electrowetting element 21. It is also possible to integrate the switch and the driver stage in a manner similar to that disclosed in U.S. Pat. No. 4,165,494 for a bi-state linear amplifier. This amplifier can switch between a low-impedance amplification state and a very high output impedance state. An advantage of the integrated switch is the lower power consumption and the cheaper implementation. Moreover, an integrated switch requires a smaller area on the display or PCB (printed circuit board).

The capacitance of the electrowetting cell may be tuned by choosing the thickness, dielectric constant or material of the insulating layer 13, e.g. by making the dielectric layer of a hydrophobic layer and an insulating layer.

Although the electrowetting element in FIGS. 1 and 2 is described as a picture element in a display device, it may be used in any application where maintaining the position of the fluids can be used advantageously, such as a general light valve, an optical diaphragm, an adjustable lens, etc.

Figure 3A:
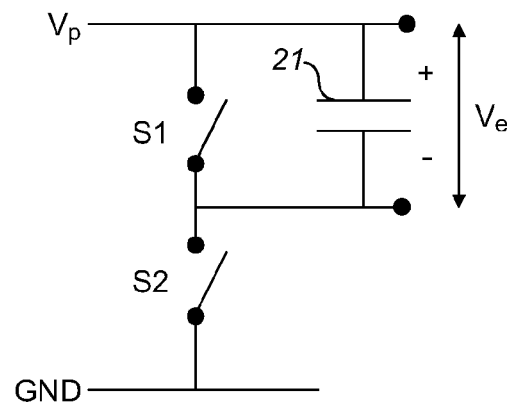
FIG. 3($a$) shows an embodiment of a driver stage.
Figure 3B:
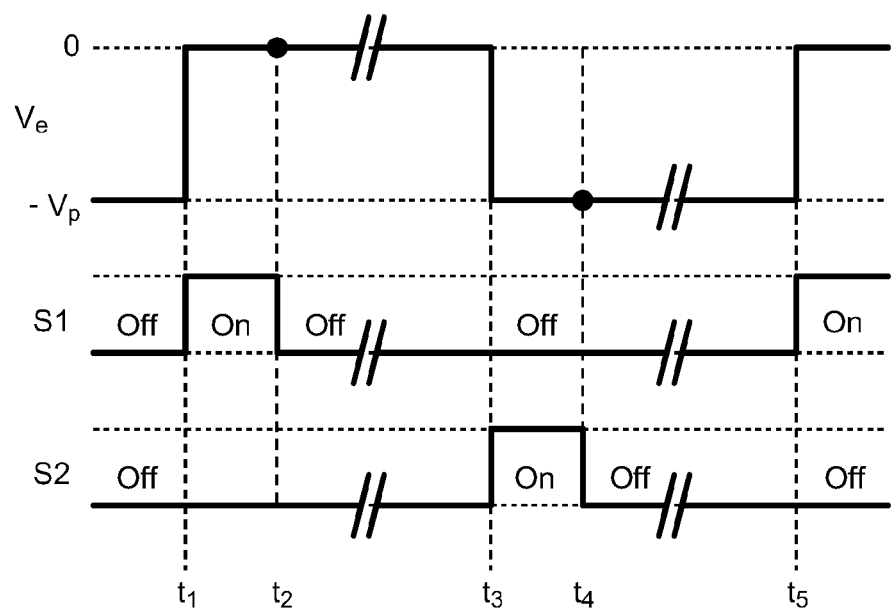

FIG. 3(a) shows an alternative embodiment of the driver stage for switching an electrowetting element, indicated by the capacitor 21, between an active state and an inactive state. A voltage $V_p$ is a voltage common for a plurality of electrowetting elements and applied to electrode 15 in FIG. 1. S1 and S2 are switches. The element state is determined by the combination of states for switches S1 and S2: when S1 is on and S2 is off, the element voltage is 0 and the element is in the off-state. When S1 is off and S2 is on, the element voltage is equal to $-V_p$, switching the element to the on-state. FIG. 3(b) shows a timing diagram of the switches. At time $t_1$ the element must be set in an inactive display state according to display data. Therefore, the switch S1 is closed and switch S2 is open (indicated as 'On' and 'Off', respectively, in the Figure). The voltage $V_e$ across the element, shown in the top trace of the Figure, is zero, resulting in an inactive element. At $t_2$ both switches are opened and the voltage $V_e$ remains zero. At $t_3$ the display state of the element must be updated and the element be set in an active state. The switch S1 is open and S2 is closed. The voltage across the element is now $-V_p$. The negative sign is a consequence of the convention to indicate the voltage at electrode 15 as zero. When at $t_4$ the switch S2 is opened, the voltage $V_e$ remains substantially equal to $-V_p$. At $t_5$ the element is set in the inactive state by closing switch S2.

In the holding states $t_2$-$t_3$ and $t_4$-$t_5$ the impedance as seen from the capacitor 21 is high because of the open switches. Since the leakage current of the element and switch is low, the voltage will remain on the element. The display state of the element is maintained in the holding state because of the quasi-stability of the element. The element does not need to be re-addressed before the display state is changed or the holding time expires, resulting in a strong reduction of power consumption in the overall system. The mode of switching shown in FIG. 3(b) is called tri-state switching because of the three different states as seen from the element: low impedance zero voltage, low impedance high voltage and high impedance any voltage.

Figure 4A:
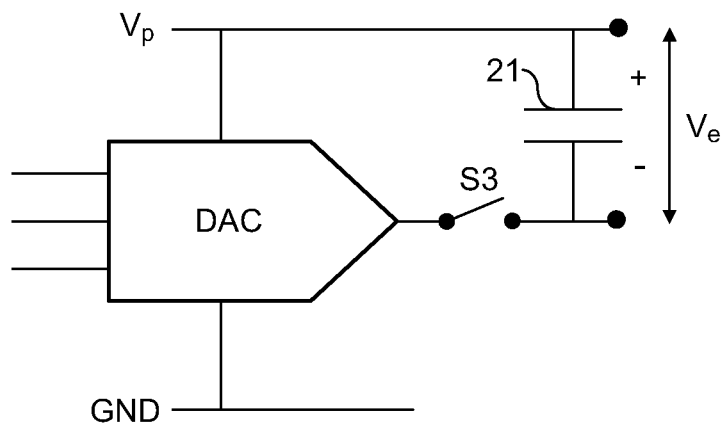
FIG. 4($a$) shows an alternative embodiment of a driver stage.
Figure 4B:
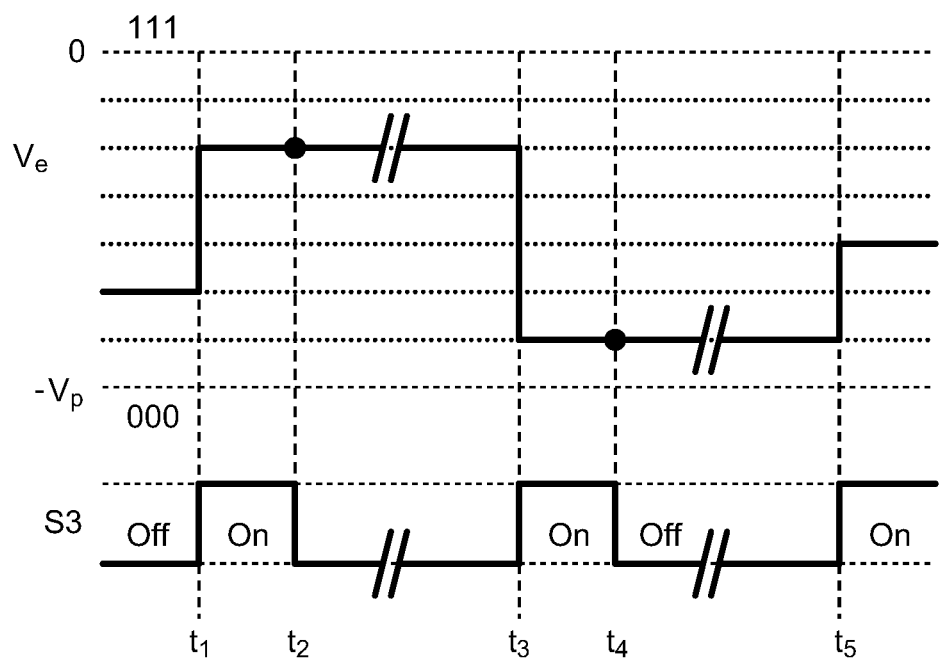

The switching procedure of FIG. 3(b) is for a driver stage having two voltage states, but a similar procedure holds for other embodiments, for example driver stages having multiple output voltages and suitable for amplitude modulated grey scales, multiple switches, non-push-pull driver stages, or digital-to-analog converters. An embodiment of a driver stage with a 3-bit DAC (digital-to-analog converter) providing 8 output levels is shown in FIG. 4(a). The output of the DAC is connected to the electrowetting element 21 via a switch S3. FIG. 4(b) shows the timing diagram of the driver stage. The voltage $V_e$ across the element shows 8 levels between zero volts and $-V_p$, corresponding to the digital DAC input values 111 and 000, respectively. At time $t_1$ the switch S3 is closed and a voltage $V_e$ corresponding to the digital input 101 is applied to the element. At $t_2$ the switch is opened and the element enters in a high-impedance holding state till $t_3$. At $t_3$ the display state is updated to the digital input 001 and at $t_1$ the element is again in the holding state. The same procedure applies to driver stages having any number of output voltages.

The impedance switching can also be combined with other methods of addressing electrowetting elements, such as addressing using frame-mixing or spatial mixing and the ones described in patent application PCT/EP2007/062427 (Reset pulse and intermittent supply voltage), patent application PCT/EP2007/062429 (booster burst modes), patent application PCT/EP2007/062428 (Vcom modulation).

Figure 5A:
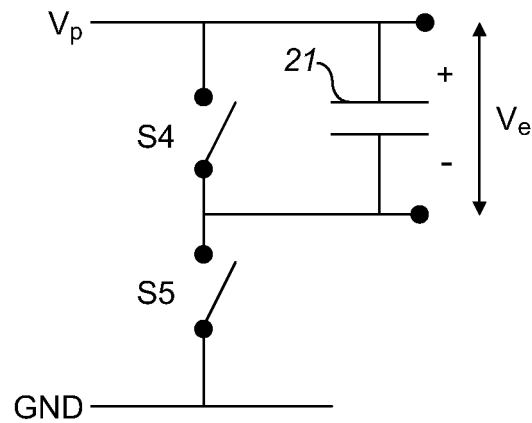
FIG. 5($a$) shows an alternative embodiment of a driver stage.
Figure 5B:
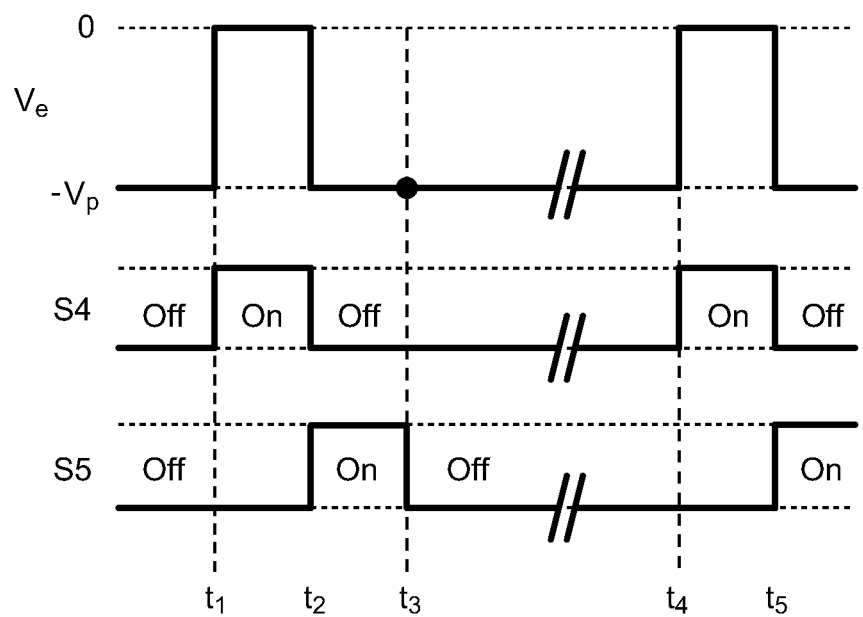

FIG. 5(a) shows a driver stage that combines impedance switching with reset pulses. The voltage Ve over the element 21 can be switched between zero volts and −Vp by two switches S4 and S5. FIG. 5(b) shows the timing diagram of the driver stage. At time $t_1$, to initiate the reset pulse, the switch S4 is switched on, reducing the voltage Ve across the element to zero. After a short period, at $t_2$, S4 returns to the open state and S5 closes, setting $V_e$ to $-V_p$. The reset pulse is applied in the period from $t_1$ to $t_2$. The period must be sufficiently short lest the reset pulse affects the observed display state of the element. Once the element has been recharged, the switch S5 is opened again at $t_3$, setting the element in the holding state. The holding state ends at $t_4$, when the switch S4 closes again for the next reset pulse, which lasts till $t_5$. In the holding state the power consumption is substantially zero. When the holding state is long compared to the charging and reset periods, the overall power reduction will be significant. As explained above, a reset pulse may advantageously be performed when required to coincide with a refresh of an electrowetting element, for example at the end of the second addressing interval.

In the present invention, an electrowetting system is provided which includes a display device as previously described, and which provides selective pixel addressing, rather than the presently more common frame addressing. The display controller of the display device is arranged to address a first electrowetting element of the display device twice subsequently, separated by a first addressing interval, and to address a second electrowetting element, different from the first electrowetting element, twice subsequently, separated by a second addressing interval. The second addressing interval is longer than the first addressing interval. The first electrowetting element is addressed at a moment at the beginning of the first addressing interval to provide a desired display state, and then again at a second moment, at the end of the first interval, to change the display state. The term change is used herein in the context of addressing an element to update its display state to provide a different display state after the addressing action than at the start of the first interval. The first interval may be set for a rapidly updating part of the display. For example, the first electrowetting element may display video, and therefore the first interval may be approximately 10 to 20 ms, or shorter, and preferably shorter than an addressing interval which a human eye is most sensitive to, as explained previously, to avoid a viewer detecting the change of the display state, for example as flicker. In contrast, the second electrowetting element may be addressed at a first moment at the beginning of the second addressing interval, to provide a desired display state, and then addressed again at a second moment at the end of the second interval to refresh the display state of the second element. The term refresh is used herein in the context of addressing an element to refresh its display state so as to maintain the same display state after the addressing action as at the start of the second interval. The second addressing interval is in embodiments of the invention a period of time for holding the second element in the same display state, after which the display state deteriorates due to limited quasi-stability. The second addressing interval may be for example approximately 70 ms to 1 s, and is preferably longer than an addressing interval which a human eye is most sensitive to, corresponding with refresh rates of approximately 5 to 15 Hz, as explained previously, to avoid a viewer of the display noticing the refresh, for example as flicker. In active matrix displays, the second addressing interval may be in the order of seconds, and in direct drive displays in the order of minutes, depending on the characteristics of the materials used to construct the display.

To provide selective pixel addressing, the signals at the output of the display controller may be in an order determined by the changes required in the display. The display controller sends signals only to those driver stages that appertain to elements that have a current display state that differs from the display state to be attained after the update. Driver stages that are not addressed can remain in a quiescent state. This reduces the number of signals to be sent to the display device substantially and, hence, reduces the power consumption of the display driving system. In addition, a data rate and clock frequency within the display controller can be reduced, resulting in further reduction of the power consumption of the display driving system.

When an element approaches the end of the holding state, i.e. it nears expiration of its second addressing interval, it should be refreshed by increasing the voltage applied to the element back to the level that produces the desired display state of the element. In a liquid crystal display device all elements are refreshed during a display refresh at a sufficiently high rate to cope with the limited stability of the element (to avoid degradation due to charging). This frame rate is typically 50 or 60 Hz, and has been increased recently to 100 or 120 Hz to achieve higher quality images. The signals at the output may be in an order determined by the expiry of the holding state.

In embodiments of the invention, the electrowetting system may include a memory store which stores data indicative of when each of the plurality of elements was last addressed to refresh or change the display state. This allows passing of the second addressing interval to be monitored for each element, using a timer for example, so that each element can be refreshed before its display state deteriorates. The data in the memory store is updated once an element display state is refreshed or changed, for example after expiration of either the first or second addressing interval. Further, if an element is nearing expiration of the second addressing interval, its display state may be changed or refreshed earlier than necessary, for example to coincide with addressing of other elements in the display. The memory store may be used to determine when to perform a global refresh of the display, such as those described later. The memory store may be for example provided in a host side display controller of the electrowetting system, for example as embedded or external memory, or in other embodiments may be located on a slave side of a display, for example in a display driver integrated circuit (IC), a memory IC or a memory in a pixel.

Electrowetting systems according to the invention may include a further memory store and a comparator. The comparator is an image data processor. During operation of the display, the further memory store contains data representing a first, present, image of the display, i.e. this data is indicative of the present display state of each element. The comparator compares the stored first image data with input image data representative of a consecutive second image of the display. Based on this comparison, the comparator generates output image data identifying those selected elements requiring a display state change, to update the display image to the consecutive second image. Non-selected elements therefore do not need a change of their display state and therefore remain unaddressed in a holding display state, unless they require a display state refresh. The display controller can therefore effect the change in display by outputting signals only for elements that require a change of display state. For example, in a direct drive display the comparator may utilise a logic exclusive or (EXOR) function where old, first image data exor new, second image data results in a display state change. Accordingly, 0 exor 0 results in no display state change, i.e. no latch, 1 exor 0 results in a display state change, i.e. a latch, 0 exor 1 results in a display state change, 1 exor 1 results in no display state change.

For active matrix, passive matrix and direct drive displays, elements may be refreshed/changed on a row by row basis, i.e. a row of elements would be selected for an update if at least one element in the row requires a display state refresh/change. A memory store may be used to track which pixels of pixel rows need refreshing or changing, for example by storing data indicating the display state of each element, or by storing data indicative of a group of pixels addressed at the first interval and a group of pixels addressed at the second interval. Alternatively, a register may be used to track which rows require addressing, such as the shift or line register described later.

In further embodiments, the further memory and comparator described above may be unnecessary, for example where the electrowetting system is arranged to utilise input image data in a format which identifies differences between consecutive images, to identify only those pixels which require a display state change between a first and second consecutive image, rather than identifying the display state of each pixel.

In such embodiments, the electrowetting system includes an image data processor arranged to process such data, for example MPEG data. Periodically, such data may be indicative of the display state of every element of the display, to ensure the image of the display is up to date. Depending on the MPEG encoding principle, and maximum bandwidth, this period may be for example be every 2 frames, or in other examples every specified number of frames, which may be a number between 3 to 16, for example 8 or higher, such as 12. This may result in a global refresh of the display, in the manner described below. Otherwise, the display state of an element may slowly become out of date with the display state required for the present image displayed, due to minor changes between consecutive images not being significant enough to be encoded in the image data. Such data carries display coordinate data for identifying the pixels that the display state change relates to. The display controller may include an address comparator for comparing the coordinate data with the addresses of the elements of the display, to identify those elements for updating.

The display controller of electrowetting systems of the invention may be arranged to refresh the display state of each electrowetting element of the display substantially simultaneously. In other words the display may be refreshed globally. Substantially simultaneously is taken to mean that each pixel of the display is refreshed at approximately the same point in time, taking into account any delay in refreshing one pixel compared with a different pixel of the display, for example in a different row. A global refresh may be performed when a predetermined proportion of elements have been held in one display state for the duration of the second addressing interval. A slave row memory store, a line memory, or a smaller capacity memory store may be used to determine when a global refresh is required. Alternatively, or further, the display controller may refresh the display state of a first group of elements substantially simultaneously at one predetermined point in time, and to refresh the display state of a second different group of elements substantially simultaneously at a different predetermined point in time. Indeed, each of a plurality of different groups of elements may be refreshed at different points in time. Each group may be for example a row or a column of elements. By refreshing each group according to a predetermined refreshing algorithm, or randomly, a global refresh of the display can be achieved without the viewer observing the refresh, rather than all elements being refreshed simultaneously.

Exemplary electrowetting systems according to the present invention will now be described.

Figure 6:
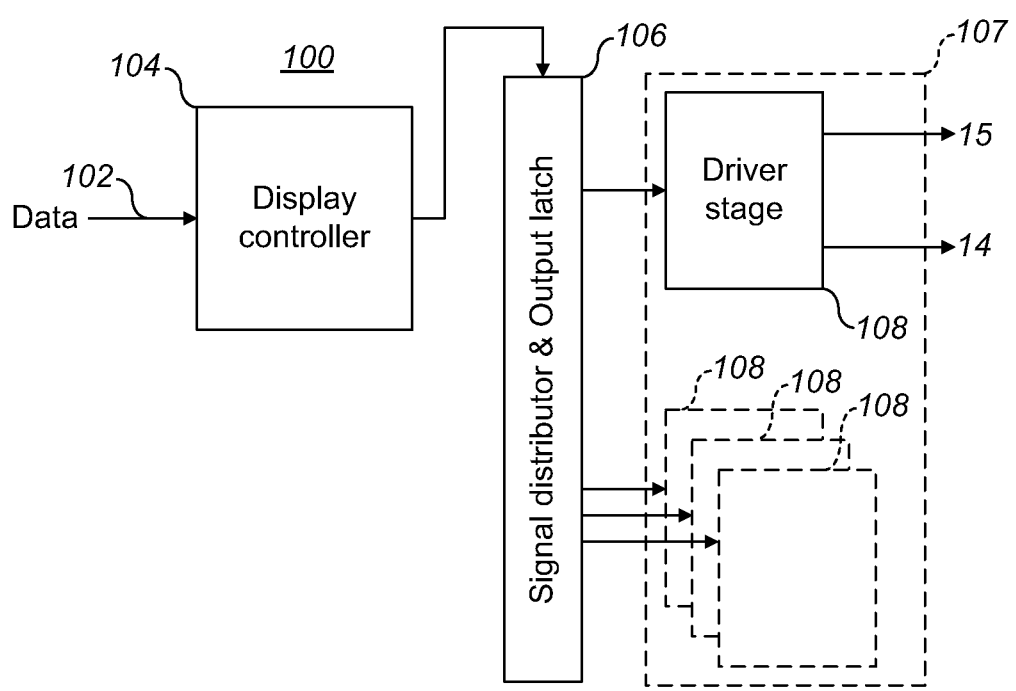
FIG. 6 shows an embodiment of an electrowetting system.

FIG. 6 shows a diagrammatic view of an embodiment of an electrowetting display driving system according to the invention. The display driving system is of the so-called direct drive type and may be in the form of an integrated circuit preferably adhered to the support plate 6 shown in FIG. 1 or integrated in the electronics elsewhere in the display module, for instance on the PCB. The display driving system 100 is connected to the display device by means of signal lines 14 and a common signal line 15. Each electrode signal line 14 connects an output from the display driving system 100 to a different electrode 9, respectively. The common signal line is connected to the second, conductive fluid 11 through an electrode. Also included are one or more input display data lines 102, whereby the display driving system can be instructed with data so as to determine which elements should be in a active state and which elements should be in a non-active state at any moment of time.

By selectively actuating certain of the electrodes 9 with an active voltage signal, the corresponding electrowetting elements are driven to an open state, in which the first fluid 12 is at least partly removed from the surface of the support plate 6, whilst other non-selected electrodes are driven with a non-active voltage signal which is equal to, or at least substantially equal to, a common voltage signal applied to the common signal line 15, i.e. the non-selected signal lines 14 and common signal line 15 have the same voltage, or a difference between them is approximately 0V The embodiment of the controller shown comprises a display controller 104, e.g. a microcontroller or hardware controller, receiving input data from the input data lines 102 relating to the image to be displayed. The output of the microcontroller is connected to the data input of a signal distributor and data output latch 106. The signal distributor distributes incoming data over a plurality of outputs connected to the display device, preferably via drivers stages 108. The signal distributor causes data input indicating that a certain element is to be set in a specific display state to be sent to the output connected to this element. The distributor may be a shift register. The input data is clocked into the shift register and at receipt of a latch pulse the content of the shift register is copied to the output latch. The output latch has a one or more outputs, connected to a driver assembly 107. The outputs of the latch are connected to the inputs of one or more driver stages 108 within the driving system. The outputs of each driver stage are connected through the signal lines 14 and 15 to a corresponding display element. The above display driving system can be used for direct-drive displays, active matrix displays or passive matrix displays.

Each driver stage includes a switch such as the one shown in FIG. 2, either as a separate element or integrated. The switch is controlled by a control signal. Each driver stage may generate this control signal itself, closing the switch when a voltage is received from the distributor 106 and opening the switch again after a certain period. The driver stages may use a common control signal to control the switches. A driver stage may also receive the control signal from the distributor.

In response to the input data a driver stage will output a voltage to set one of the elements in a display state. When the switch opens, the element is in the holding state.

Figure 7:
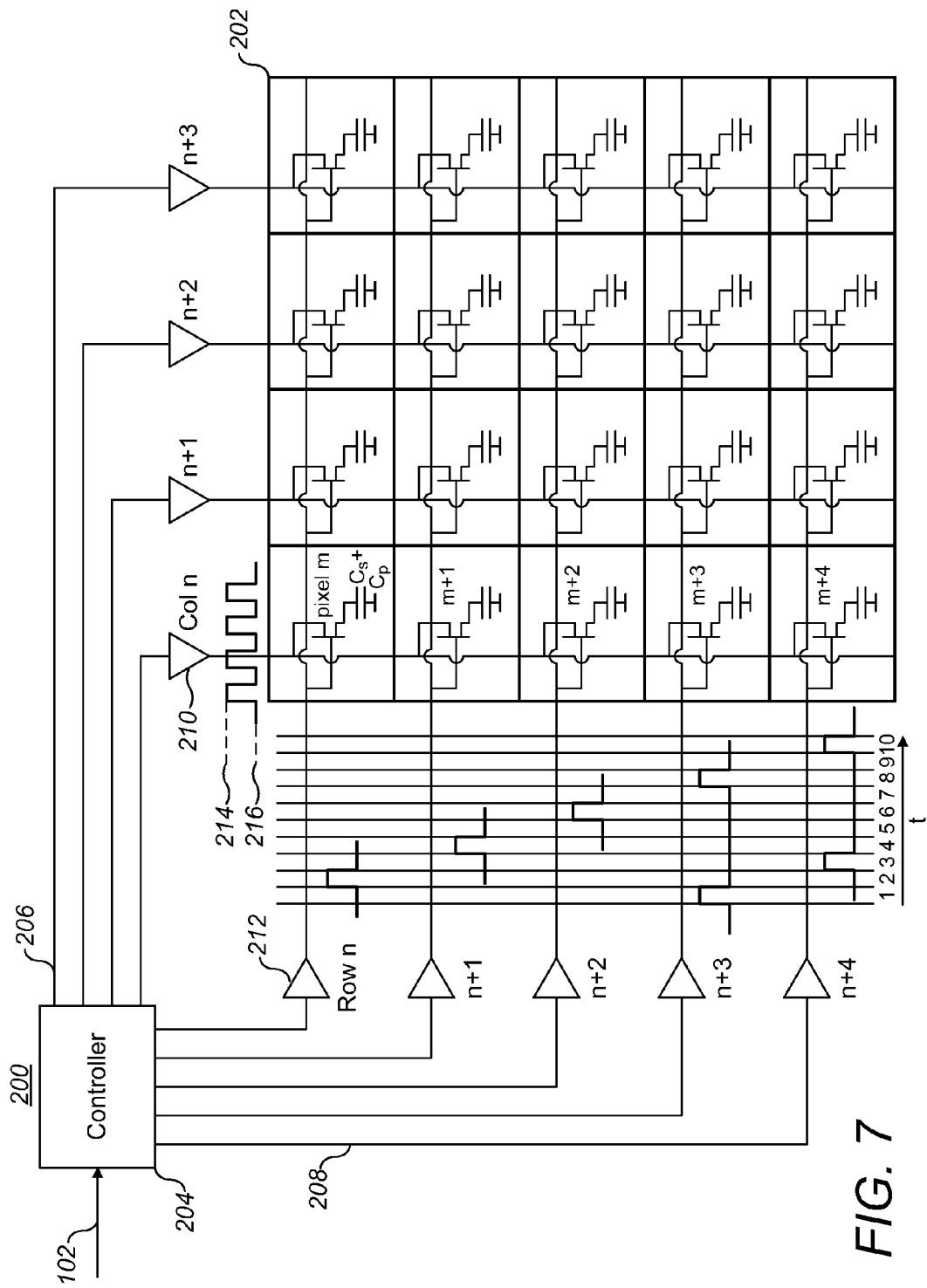
FIG. 7 shows a further embodiment of an electrowetting system.

FIG. 7 shows a diagrammatic view of another embodiment of an electrowetting display driving system 200 according to the invention for controlling the image of a matrix display device 202. The display elements of the display device are arranged in the form of a matrix having a plurality of columns and a plurality of rows. The Figure shows four columns labelled n to n+3 and five rows labelled n to n+4.

The display driving system 200 is of the so-called active matrix type and may be in the form of an integrated circuit preferably adhered to the support plate 6. The controller shown comprises a microcontroller or hardware controller 204 including control logic and switching logic. It receives input data from the input data lines 102 relating to the image to be displayed. The microcontroller has an output for each column of the display device, providing a column signal. A column signal line 206 connects each output to a column of the display device. The microcontroller also has an output for each row of the display device, providing a row selection signal. A row signal line 208 connects each output to a row of the display device. A column driver 210 and a row driver 212 is arranged in each column and row signal line, respectively. The Figure shows the signal lines only for those columns and rows shown in the Figure. The row drivers may be integrated in a single integrated circuit. Similarly, the column drivers may be integrated in a single integrated circuit. The integrated circuit may include the complete driver assembly. The integrated circuit may be integrated on the support plate 6 of the display device. The integrated circuit may include the entire display driving system.

Each element of the display device 202 includes an active element in the form of one or more transistors. The transistor may be a thin-film transistor. The transistor operates as a switch. The electrodes of the element are indicated as a capacitor $C_p$. The line connecting the capacitor to a common voltage is the common signal line 15 and the line connecting the capacitor to the transistor is the signal line 14 shown in FIG. 1. The element may include an optional capacitor $C_s$ for storage purposes or for making the duration of the holding state or the voltage applied to the element uniform across the display device. This capacitor is arranged in parallel with $C_p$ and is not separately shown in FIG. 7. The column drivers provide the signal levels corresponding to the input data for the elements. The row drivers provide the signals for selecting the row of which the elements are to be set. The Figure shows a series of selecting signals for the rows for times t=1 to 10. A sequence of voltages of one of the column drivers 210 is shown in the Figure. The signal levels 214 and 216 indicates signal levels corresponding to input data.

When the transistor of an element receives a row selection signal, it passes the signal level of its column driver to the electrodes of the cell. After the transistor has been switched off, the voltage over the cell will substantially be maintained until the transistor is switched on again by the next row selection signal for the element. The time during which the transistor is switched off is the holding state of the element.

Figure 8:
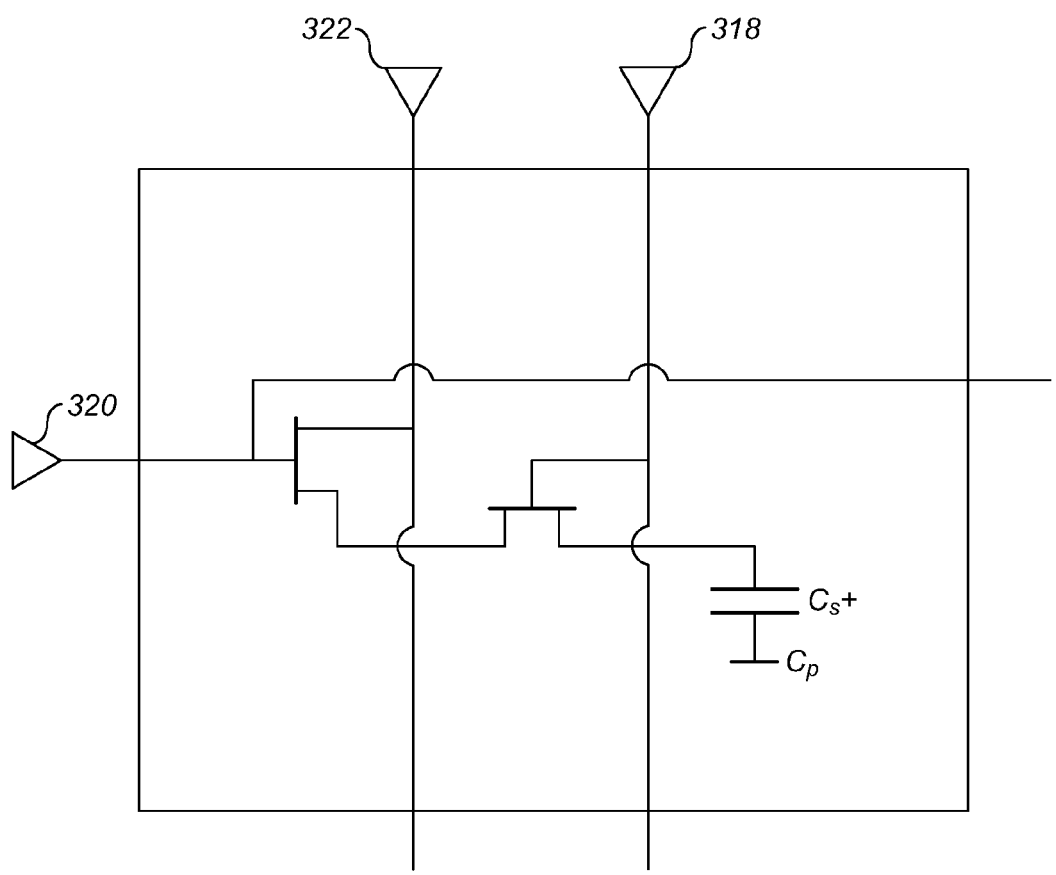
FIG. 8 shows part of an electrowetting system of a further embodiment.

According to a further embodiment, FIG. 8 shows an alternative configuration of each pixel of the active matrix display described previously using FIG. 7. In this embodiment, each pixel includes two transistors; one for column selection using a first column driver 318 and one for row selection using a row driver 320. The column signal voltage is applied by another column driver 322 and is passed to the electrodes of the cell when the pixel is selected by switching on both transistors using the first column driver 318 and the row driver 320. In this way, the display state of a pixel is only changed/refreshed when the appropriate column and row are selected, meaning that only one column dissipates power compared with the previous embodiment. Accordingly, the display state of pixels that need changing are addressed, and for those pixels which are to remain unchanged no display state signals are communicated. Addressing of the pixels in this way can be done during row by row scanning of the display, as described before, or by scanning only those rows which contain pixels for updating or refreshing. In this embodiment, there are two column circuit lines per pixel, connecting two column drivers to each pixel. This therefore doubles the number of column drivers, which may be disadvantageous. In further embodiments, at least two column selection lines of different pixels may be connected together, and to one column driver 318, to reduce the number of connections and drivers required, thus simplifying manufacture and reducing the number of drivers in the display. The number of column drivers may be reduced further by defining areas of elements, i.e. blocks or groups of elements that are updated simultaneously, thus reducing the number of column drivers by increasing the number of elements addressed at one time. This approach may also be applied to row connectivity; more than one row of elements can be connected to one driver. Then, by selecting both the column and row for a pixel, the pixel can be updated or changed. For example, six rows can be connected; a first and second row connected to a first row driver, a third and fourth row to a second row driver, and a fifth and sixth row to a third row driver. By also connecting the second and third rows with a first column driver, and the fourth and fifth rows with a second column driver, a pixel can be selected from the second row by selecting the first row driver and the first column driver. With such a connection scheme, the number of drivers required can be reduced for both columns and rows.

The above embodiments are to be understood as illustrative examples of the invention. Further embodiments of the invention are envisaged. For example, the plurality of electrowetting elements of the invention may be arranged in groups with a first group including the first electrowetting element, and a second group including the second electrowetting element. In such embodiments, the display controller is arranged to address the first group twice subsequently, separated by the first addressing interval, and to address the second group twice subsequently, separated by the second addressing interval. In this way, different parts of a display may be written using different frame rates. For example, the first group may display a menu bar or icons in the display and is therefore driven at a low frame rate, by refreshing the elements according to the second addressing interval, because its display state does not change frequently. Another part of the display corresponding to the second group, e.g. an inset of the display showing a video, can be driven at a high frame rate, according to the first addressing interval. An electrowetting element allows at the same time both low frame rate refresh and video-mode display update in the same display. Selectively addressing groups of elements in this way can be applied to direct drive, active matrix and passive matrix displays, such as those described above, or in displays including both an active matrix display region and a direct drive display region, as described further below, and may be controlled using a memory store and comparator such as those described above and adapted for pixel group addressing. A memory store may be used to identify which elements belong to which pixel group, in order that the pixels are addressed according to the correct interval. In other embodiments, the memory store described herein may be provided by using the current display state of each electrowetting element as a stored record of each pixel's display state. Or, the memory store may be omitted in other embodiments, by for example refreshing the first electrowetting element when the second electrowetting element is refreshed at the end of the second addressing interval, even if a refresh of the first electrowetting element is not yet required. In this way it is not necessary to memorise which elements, including the first and second elements, are due to be refreshed, and when this refresh is due.

For the active matrix display, the display driving system 200 may include a display controller similar to the display controller 104 shown in FIG. 6, allowing partial update or refresh of the display device. When the display state of one group of elements requires changing, the display controller sends signals to the column and row drivers, such that the rows that intersect the group of elements to be changed are selected. Updating of elements is also carried out for complete rows, but effectively only changes the pixel states at the intersections of those rows that have been selected and those columns that are addressed.

It is envisaged in further embodiments that a display includes electrowetting elements arranged for control using a direct drive configuration and other electrowetting elements arranged for control using an active matrix configuration. For example, the active matrix driven elements may be used to display images which change relatively quickly, such as video images. The direct drive configured elements may display infrequently changing images compared with the images of the active matrix elements. Such infrequently changing images may include, for example, icon, button, menu or clock images. The advantage of using a direct drive configuration for at least some of the electrowetting elements of the display is that only one driver, with a higher capacitance load than for active matrix drivers, may be used to drive the elements displaying one infrequently changing image. Accordingly, a separate driver for each row and column corresponding to each element of the direct driven region of the display is unnecessary. Further, a direct drive region of elements in an active matrix driven display provides a greater degree of design freedom for shapes and forms of direct driven display regions which display infrequently changing images.

Examples of electrical circuitry for controlling displays in accordance with the present invention have been described above, for example with reference to the Figures and with reference to patent application PCT/EP2007/062427 (Reset pulse and intermittent supply voltage), patent application PCT/EP2007/062429 (booster burst modes), and patent application PCT/EP2007/062428 (Vcom modulation). It is understood that in further envisaged embodiments alternative electrical circuitry may be used for controlling displays of the present invention, particularly circuitry using transistors, such as thin film transistors, for electrical switching.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An electrowetting system including a display device having a plurality of electrowetting elements, including a first electrowetting element and a second electrowetting element, each being configurable in a plurality of different display states; and a display controller for selective electrical addressing of the plurality of electrowetting elements in order to switch the plurality of electrowetting elements between different display states, wherein the display controller is arranged:

to address the first electrowetting element twice subsequently, separated by a first addressing interval, wherein said addressing at the end of the first addressing interval is arranged to change the display state of the first electrowetting element; and to address the second electrowetting element twice subsequently, separated by a second addressing interval, the second addressing interval being longer than the first addressing interval, wherein said addressing at the end of the second addressing interval is arranged to reset the display state of the second electrowetting element having deteriorated due to backflow whilst maintaining a display state of the second electrowetting element as perceived by a viewer, the display state of the second electrowetting element remaining unchanged during said changing of the display state of the first electrowetting element.

2. An electrowetting system according to claim 1, wherein at the end of the second addressing interval the display controller is arranged to refresh the display state of the second electrowetting element.

3. An electrowetting system according to claim 2, wherein the second addressing interval is longer than an addressing interval which a human eye is most sensitive to.

4. An electrowetting system according to claim 2, wherein said refresh of the display state of the second electrowetting element restores a display state of the second electrowetting element, having deteriorated due to resistive losses, to a display state of the second electrowetting element at the start of the second addressing interval.

5. An electrowetting system according to claim 1, wherein the display controller is arranged to change the display state of the first electrowetting element when a display state change is required.

6. An electrowetting system according to claim 5, wherein the first addressing interval is shorter than an addressing interval which a human eye is most sensitive to, wherein said address of the first electrowetting element twice subsequently, separated by the first addressing interval, includes a first addressing of the first electrowetting element at a start of the first addressing interval and a second addressing of the first electrowetting element at an end of the first addressing interval.

7. An electrowetting system according to claim 1, wherein the plurality of electrowetting elements is arranged for passive matrix operation, active matrix operation or direct drive operation.

8. An electrowetting system according to claim 1 including at least one driver stage electrically connected to at least one of the plurality of electrowetting elements, wherein the display controller is arranged to control the at least one driver stage to determine the display state of at least one of the plurality of electrowetting elements and the driver stage has a high impedance state.

9. An electrowetting system according to claim 8, wherein at least one driver stage is electrically connected to a plurality of electrowetting elements.

10. An electrowetting system according to claim 1, wherein the display controller is arranged to refresh the display state of each of the plurality of electrowetting elements substantially simultaneously.

11. An electrowetting system according to claim 1, wherein the display controller is arranged to refresh the display state of a first group of the plurality of electrowetting elements at a predetermined point in time and to refresh the display state of a second, different, group of the plurality of electrowetting elements at a different predetermined point in time.

12. An electrowetting system according to claim 11, wherein the display controller is arranged to refresh the first group and second group randomly.

13. An electrowetting system according to claim 1, comprising a memory store arranged to store data of the time elapsed since last addressing each of the plurality of electrowetting elements.

14. An electrowetting system according to claim 1, including an image data processor arranged to compare input image data representative of a first image with input image data representative of a consecutive second image, before said second image is displayed, to generate output image data identifying which of the plurality of electrowetting elements require a display state change.

15. An electrowetting system according to claim 1, including an image data processor arranged to process input image data indicative of image differences between a first image and a consecutive second image to identify which of the plurality of electrowetting elements require a display state change.

16. An electrowetting system according to claim 15, wherein periodically the input image data is indicative of a display state of each of the plurality of electrowetting elements.

17. An electrowetting system according to claim 1, wherein the plurality of electrowetting elements has a first group of electrowetting elements including the first electrowetting element, and a second group of electrowetting elements including the second electrowetting element, and the display controller is arranged to address the first group twice subsequently, separated by the first addressing interval and to address the second group twice subsequently, separated by the second addressing interval.

18. An electrowetting system according to claim 1, wherein the display controller is arranged to change the display state of the first electrowetting element when a display state change is required, in accordance with a required frame rate.

19. An electrowetting system according to claim 1, wherein said change of the display state of the first electrowetting element is an update of the display state of the first electrowetting element to provide a different display state than the display state of the first electrowetting element at the start of the first addressing interval.

20. An electrowetting system according to claim 1, wherein said reset of the display state of the second electrowetting element restores a display state of the second electrowetting element, having deteriorated due to backflow, to a display state of the second electrowetting element at the start of the second addressing interval.

21. An electrowetting system according to claim 1, wherein said address of the first electrowetting element twice subsequently, separated by the first addressing interval, includes a first addressing of the first electrowetting element at a start of the first addressing interval and a second addressing of the first electrowetting element at an end of the first addressing interval.

22. An electrowetting system according to claim 1, wherein said address of the second electrowetting element twice subsequently, separated by the second addressing interval, includes a first addressing of the second electrowetting element at a start of the second addressing interval and a second addressing of the second electrowetting element at an end of the second addressing interval.

23. An electrowetting system according to claim 1, wherein the display controller is arranged:
    to address the first electrowetting element at a start of the first addressing interval to reset a display state of the first electrowetting element, having deteriorated due to backflow before the first addressing interval, to a display state of the first electrowetting element before the deterioration due to backflow before the first addressing interval, and
    to address the second electrowetting element at a start of the second addressing interval to reset a display state of the second electrowetting element, having deteriorated due to backflow before the second addressing interval, to a display state of the second electrowetting element before the deterioration due to backflow before the second addressing interval.

24. An electrowetting system according to claim 1, wherein the display controller is arranged:
    to address the first electrowetting element at a start of the first addressing interval to change a display state of the first electrowetting element to a different display state than a display state before the start of the first addressing interval, and
    to address the second electrowetting element at a start of the second addressing interval to change a display state of the second electrowetting element to a different display state than a display state before the start of the second addressing interval.

25. A display controller for selective electrical addressing of a plurality of electrowetting elements in order to switch the plurality of electrowetting elements between different display states, wherein the plurality of electrowetting elements includes a first electrowetting element and a second electrowetting element, and the display controller is arranged:
    to address the first electrowetting element twice subsequently, separated by a first addressing interval, wherein said addressing at the end of the first addressing interval is arranged to change the display state of the first electrowetting element; and
    to address the second electrowetting element twice subsequently, separated by a second addressing interval, the second addressing interval being longer than the first addressing interval, wherein said addressing at the end of the second addressing interval is arranged to reset the display state of the second electrowetting element having deteriorated due to backflow whilst maintaining a display state of the second electrowetting element as perceived by a viewer,
    the display state of the second electrowetting element remaining unchanged during said changing of the display state of the first electrowetting element.

26. A driver stage for electrical connection to at least one of a plurality of electrowetting elements, wherein the driver stage is arranged to selectively address electrically, under control of a display controller, at least one of the plurality of electrowetting elements in order to switch the plurality of electrowetting elements between different display states, wherein the plurality of electrowetting elements includes a first electrowetting element and a second electrowetting element and the driver stage is suitable for addressing the first electrowetting element at the end of a first addressing interval to change the display state of the first electrowetting element, and for addressing the second electrowetting element at the end of a second addressing interval to reset the display state of the second electrowetting element, the display state of the second electrowetting element having deteriorated due to backflow, whilst maintaining a display state of the second electrowetting element as perceived by a viewer, the second addressing interval being longer than the first addressing interval and the display state of the second electrowetting element remaining unchanged during said changing of the display state of the first electrowetting element.

27. A driver stage according to claim 26 having a high impedance state.

28. A method of controlling a display device having a plurality of electrowetting elements including a first electrowetting element and a second electrowetting element, each being configurable in a plurality of different display states by selective electrical addressing of the electrowetting element, the method including:
    a) addressing the first electrowetting element twice subsequently, separated by a first addressing interval, wherein said addressing at the end of the first addressing interval is arranged to change the display state of the first electrowetting element; and
    b) addressing the second electrowetting element twice subsequently, separated by a second addressing interval, wherein said addressing at the end of the second addressing interval is arranged to reset the display state of the second electrowetting element having deteriorated due to backflow whilst maintaining a display state of the second electrowetting element as perceived by a viewer,
    the second addressing interval being longer than the first addressing interval and the display state of the second electrowetting element remaining unchanged during said changing of the display state of the first electrowetting element.

* * * * *